FRACTIONAL BINARY TO BINARY-CODED-DECIMAL AND BINARY-CODED-DECIMAL TO WHOLE NUMBER BINARY CONVERSION DEVICES

Filed Feb. 19, 1963 3 Sheets-Sheet 1

INVENTOR.

ALEXANDER BERNSTEIN

BY Hugh L. Millis Jr.

INVENTOR.
ALEXANDER BERNSTEIN
BY
Hugh L. S. Miller Jr.

June 21, 1966 A. BERNSTEIN 3,257,547

FRACTIONAL BINARY TO BINARY-CODED-DECIMAL AND BINARY-CODED-DECIMAL TO WHOLE NUMBER BINARY CONVERSION DEVICES

Filed Feb. 19, 1963 3 Sheets-Sheet 3

INVENTOR.

ALEXANDER BERNSTEIN

BY Hugh L. Millis Jr.

United States Patent Office 3,257,547
Patented June 21, 1966

3,257,547

FRACTIONAL BINARY TO BINARY-CODED-DECIMAL AND BINARY-CODED-DECIMAL TO WHOLE NUMBER BINARY CONVERSION DEVICES

Alexander Bernstein, San Diego, Calif., assignor to Cubic Corporation, San Diego, Calif., a corporation of California Filed Feb. 19, 1963, Ser. No. 259,592
7 Claims. (Cl. 235—155)

The present invention relates to a fractional binary to binary coded decimal and binary coded decimal to whole number binary number converters and, more particularly, to electronic digital apparatus for converting fractional input binary numbers to binary coded decimal form and additionally converting binary coded decimal numbers into whole number binary coded decimal form.

An overwhelming majority of digital computers operate internally in the binary number system. This particular number system has evolved since two, and only two, digits can be cheaply, reliably, and accurately presented, stored and operated on by existing electronic techniques. There are, in general, two different ways in which binary digits are arranged in computers. First of all, the various numbers within the computer may be in straight binary number form, and more specifically, in fractional form in which the binal point is assumed to the left of the most significant digit. In general, most computers employed for scientific computation come within this straight fractional binary number category.

On the other hand, another class of digital computers operates in the binary coded decimal or BCD form, in which the series of binary digits are divided into groups of four, each of such groups, representing by the values of its individual binary digits, one of the decimal digits, zero through nine. This class of computers is most often involved where large masses of input data are involved, and comes from business or other activities employing the decimal number system.

The one major problem arising in employing these two different forms of internal data representations in digital computers is the difficulty of communicating between the two types. Such communication obviously requires a conversion from binary to BCD, in one case, and a conversion from BCD to binary in the other. The most general technique for converting from fractional binary into BCD, has been to successively multiply the fractional binary number by the decimal ten, that is, 1010 in binary form, and taking the four most significant digits resulting from each multiplication process as the next most significant binary coded decimal digit of the answer. The continued multiplication by 1010 and extraction of the four most significant digits of the results is continued until the entire initial binary number has been converted into binary coded decimal form. General purpose computers usually must employ subroutines to perform this the conversion while special purpose digital computing apparatus built specifically to handle this function is both costly and complex.

In the same way, the conversion from BCD to straight binary form is essentially a divide by two process in which BCD numbers are continuously divided by two with the consecutive remainders from the division operations forming the resulting binary number. Again, considerable hardware is required to mechanize the process for special purpose computers, or reasonably involved subroutines are required for the conversion in general purpose computers.

The converter of the present invention provides an extremely elegant, simple and fast conversion from fractional binary to BCD and additionally, from BCD to whole number binary. Alternate cycles are executed in the conversion process, that is, a shift operation is first performed which is followed by a fix-up operation. In particular, the fractional binary number to be converted is shifted out, one bit each cycle, least significant digit first, into a series of BCD units each having four flip-flops arranged to represent the binary coded decimal digit. During the fix-up cycle, the most significant digit in each BCD unit is examined and if "1," a three, or in binary form, 0011, is subtracted from the BCD number with the result immediately being placed in the four flip-flops still in BCD form. By employing these two cycles alternately, as will be shown in more exhaustive detail later, a complete binary to BCD conversion is effected in a number of cycles equal to the number of initial binary bits in the binary number.

According to another version of the present invention, a BCD number is converted into a binary number in which the same two cycles of operation, shift and fix-up, are followed, the binary coded decimal numbers being shifted to the right into the binary register during the shift operation. Then, again, during fix-up, the most significant bit in each BCD unit examined, and, if "1," a three is subtracted from the value of the BCD number. Again, when the binary register has been filled, the binary to conversion process is halted.

In a final embodiment, which represents a combination of the first two operations, an input fractional binary number is first converted into BCD and the resulting BCD number is converted into whole number binary, the process being continuous. This last conversion process is equivalent to multiplying a fractional binary number by some predetermined power of ten.

It is, accordingly, the principal object of the present invention to provide binary to BCD and BCD to binary conversion devices.

Another object of the present invention is to provide a digital number system conversion device in which a fractional binary number is first converted into a corresponding binary coded decimal number and the binary coded decimal number then converted into a whole binary number.

Still another object of the present invention is to provide a digital converting device in which a fractional binary number, initially held in a stepping register, is stepped out serially into a series of binary coded decimal conversion devices which act to form, by the end of the stepping operation, a series of binary coded decimal digits forming a decimal number whose value corresponds to the initial binary number.

A further object of the present invention is to provide a digital conversion device for an initial binary coded decimal number into an equivalent series of binary digits forming a whole binary number in which the conversion takes place by a series of alternate stepping and conversion cycles which changes the series of binary coded decimal number digits into series of resulting binary digit.

A still further object of the present invention is to convert a binary number scaled in fraction form and held in a register into a corresponding decimal binary coded decimal number held in a number of serially arranged conversion devices, each of the conversion devices including a stepping register, the binary number and the contents of the stepping registers in the conversion devices being shifted one bit serially from the register and through the stepping registers alternately with a fix-up operation in which a predetermined binary number is subtracted from each stepping register holding a most significant value of "1" to thereby effect a fractional binary to binary coded decimal number conversion.

Another object of the present invention is to convert a decimal binary coded decimal number held in a number of serially arranged conversion devices into a corresponding binary number scaled in whole number form and held in a register, each of the conversion devices including a stepping register, the contents of the stepping registers in the conversion devices being shifted one bit serially through the stepping registers into the binary number register alternately with a fix-up operation in which a predetermined binary number is subtracted from each stepping register holding a most significant value of "1" to thereby effect a binary coded decimal number to whole number binary conversion.

Other objects, features and attendant advantages of the present invention will become more apparent to those skilled in the art as the following disclosure is set forth, including a detailed description of a preferred embodiment of the invention as illustrated in the accompanying sheets of drawings, in which.

Figure 1:
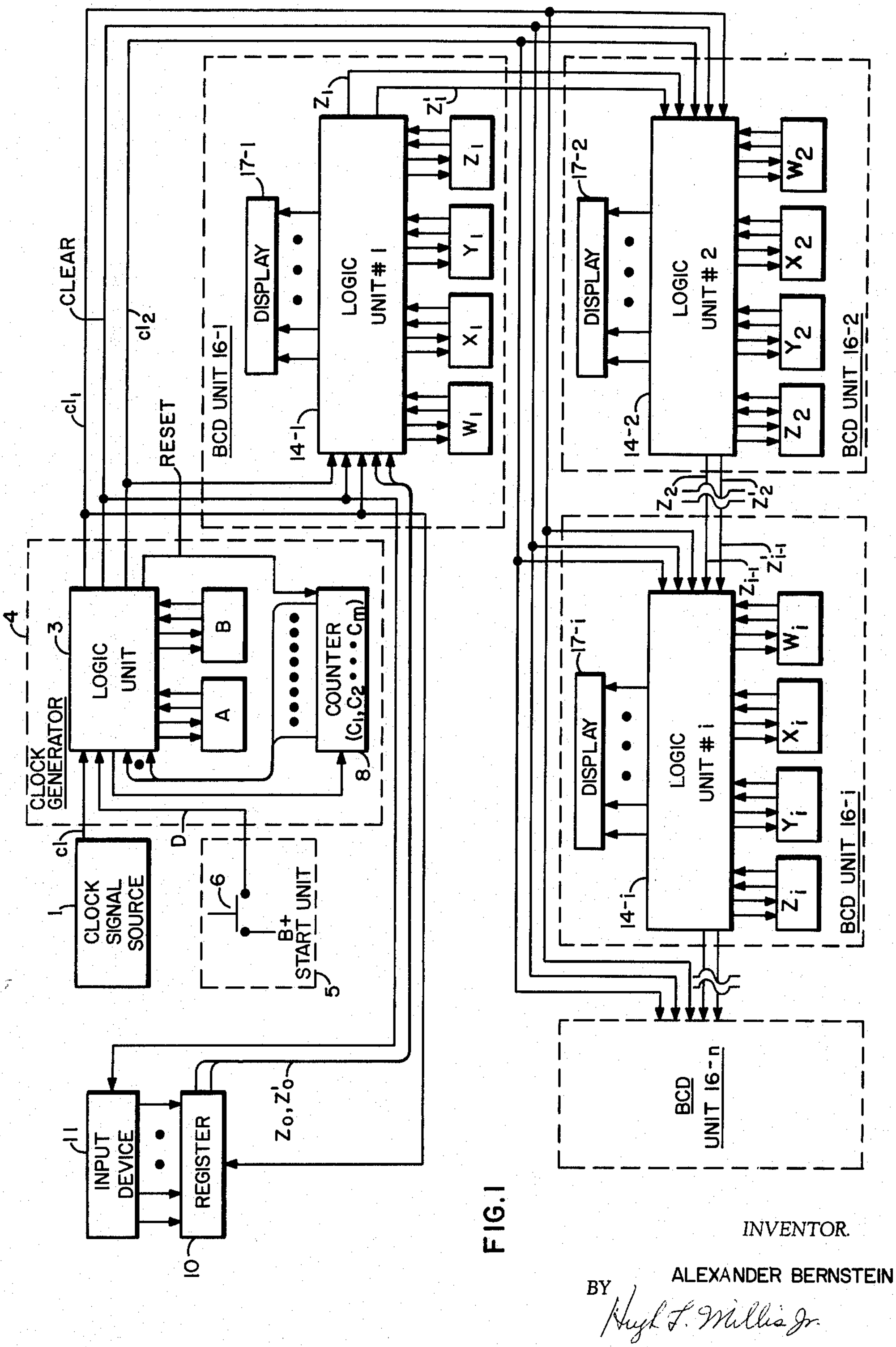
FIGURE 1 is a block diagrammatic representation of a fractional binary number to binary coded decimal converter.

Referring now to the drawings wherein the same circuit elements are given identical numerical designations throughout the several figures, there is illustrated in FIGURE 1 a fractional binary number to binary-coded decimal conversion unit. In particular, the output signal, designated *c*1, of a clock signal source 1 is applied directly to a logic unit 3 included within a clock generator 4. In addition, a start unit 5 includes a push button 6 adapted, when depressed, to make a shorting contact between the B+ terminal of a source of potential, not specifically shown, and an output conductor, carrying a logic signal D, coupled to logic unit 3.

Clock generator 4 additionally includes a pair of flip-flops A and B which receive triggering signals from the logic unit and whose respective pairs of output complementary signals are applied back to the logic unit. In addition, a counter 8 is indicated which receives input signals to be counted and a reset signal from logic unit 3, and whose series of complementary output signal pairs from an included series of flip-flops, not specifically shown, are applied back to the logic unit. Four output signals are generated by clock generator 4 including a first clock signal $c1_1$, a second clock signal $c1_2$, a clear signal and a counter reset signal appearing on four respective conductors as designated in the figure.

The particular fractional binary number to be converted by the device of the present invention is found in a binary register 10 comprising a series of flip-flops, not specifically identified, which are entered individually from an input device generally designated at 11. Input device 11 may be, for example, a manual switch entry device, the output signals from a magnetic or paper tape reader, a portion of an arithmetic unit of a general purpose computer, or any other type of digital apparatus which produces output binary digit numbers in fractionally scaled from as a portion of its overall function. The $c1_1$ signal from clock generator 4 is applied as a stepping input signal to register 10 with the pair of complementary signals, designated $Z_0$ and $Z_0'$ constituting the register 10 output values from its final flip-flop. Signals $Z_0$ and $Z_0'$ are applied to a logic unit 14–1 within a first binary coded decimal or BCD unit 16–1. In addition, BCD unit 16–1 includes four associated flip-flops designated $W_1$, $X_1$, $Y_1$, and $Z_1$ all in signal logical communication with its respective logic unit 14–1. In addition, a display unit is indicated at 17–1 and represents any conventional display capable of indicating the output conduction state combination of the associated flip-flops, preferably in the decimal number system. For example, the display unit may include a decoding matrix which decodes the particular conduction state combination of the $W_1$, $X_1$, $Y_1$, and $Z_1$ flip-flops into ten output conductors which, in turn, may be coupled to respective individual display or indicators representing the ten decimal digits 0 through 9.

The $Z_1$ and $Z_1'$ output signals from flip-flop $Z_1$ are applied to logic unit 14–2 within a second BCD unit 16–2. BCD unit 16–2 is similar in all respects to unit 16–1 and the output signals of its final flip-flop $Z_2$, represented by $Z_2$ and $Z_2'$, are applied to the next BCD unit in the series, not specifically shown. All additional BCD units are similar to the two thus described, each receiving as input stepping signals, the Z flip-flop complementary pair of signals pass in the preceding unit. A representative BCD unit **16–*i* is shown which includes a display unit 17–*i*, a logic unit 14–*i* and associated flip-flops. This unit 16–*i*** is given in order that the logical equations representing the logic of all of the units may be presented in a single, generalized form.

For understanding the operation of the FIGURE 1 conversion device, assume, first of all, that a binary number has been inserted into register 10 from input device 11. Assume further, that the binary number in register 10 is scaled to be in fractional form, that is, it may be viewed as having a binal point just to the left of the left hand digit of the series of digits represented by the series of register flip-flops. Hence, .1000 would represent a value of ½, .0100 would represent a value of ¼, .0010 would represent a value of ⅛, etc.

Figure 2:
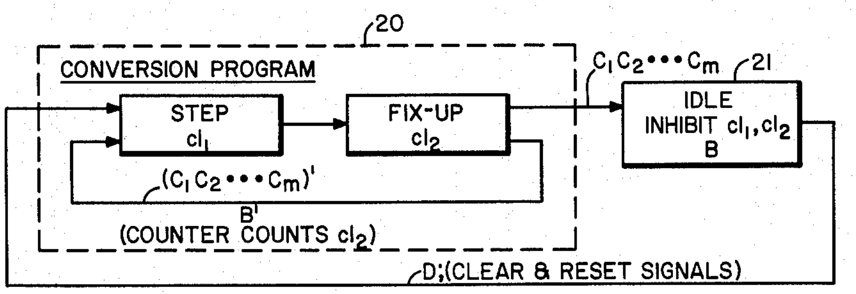
FIGURE 2 is a programming diagram for illustrating the operation of the FIGURE 1 circuitry.

The operation of the FIGURE 1 converter takes place in two major programs: (1) a conversion program during which all register 10 digits are stepped into the series of BCD units and there converted to a corresponding binary coded decimal number, and (2) an idle program in which no action takes place, with only a display of the results of the previous conversion cycle being available in the various display units. These programs are illustrated in FIGURE 2 where the conversion program is indicated in dotted block 20 and the idle program is indicated in block 21.

During the conversion cycle, two alternate logical operations are continuously performed until completion of the conversion. These include, first of all, a stepping operation ordered by each $c1_1$ clock signal, in which all digits in register 10 and the various BCD units are stepped one place to the right and secondly, a fix-up operation, ordered by each appearance of the $c1_2$ clock signal, in which a partial conversion of the binary number resulting in each BCD unit from the previous stepping operation is performed. It is clock generator 4 which controls the conversion and idle programs in conjunction with the clock signal *c*1 from source 1, and the start signal D from the start push-button 6.

In particular, clock generator 4 produces the two clock signals $c1_1$ and $c1_2$ during the conversion program 20 and both the counter reset and the clear signal, on correspondingly designated conductors, during the change from the idle to the conversion program. The conduction state of flip-flop B serves to distinguish between the conversion and the idle programs. In particular, the conduction state B' or $B$="0", serves to order the conversion program carried out while the conduction state B or $B$="1", orders idle program 21. The pair of clock signals $c1_1$ and $c1_2$ are produced during conversion program 20 by triggering flip-flop A within clock generator 4 to simply count the input *c*1 signal and employing output signal A or $c1_1$ and its complementary signal A' as $c1_2$.

In considering the particular nomenclature employed for the various flip-flops, their input and output signals, each flip-flop is given an alphabetical designation and its included pair of input conductors are termed S and Z, representing set and zero, respectively, followed by the flip-flops alphabetical nomenclature as a subscript. For example, the set and input terminals of flip-flop A entitled are given by $S_a$ and $Z_a$ and its pair of complementary output signals are designated A and A′. A triggering signal applied to the $S_a$ input terminal triggers flip-flop A such that its output signal A equals "1" with its complementary signal A′ being equal to "0". On the other hand, a triggering signal applied to the $Z_a$ input terminal triggers flip-flop A such that output signal A equals "0" and signal A′ equals "1".

Figure 3:
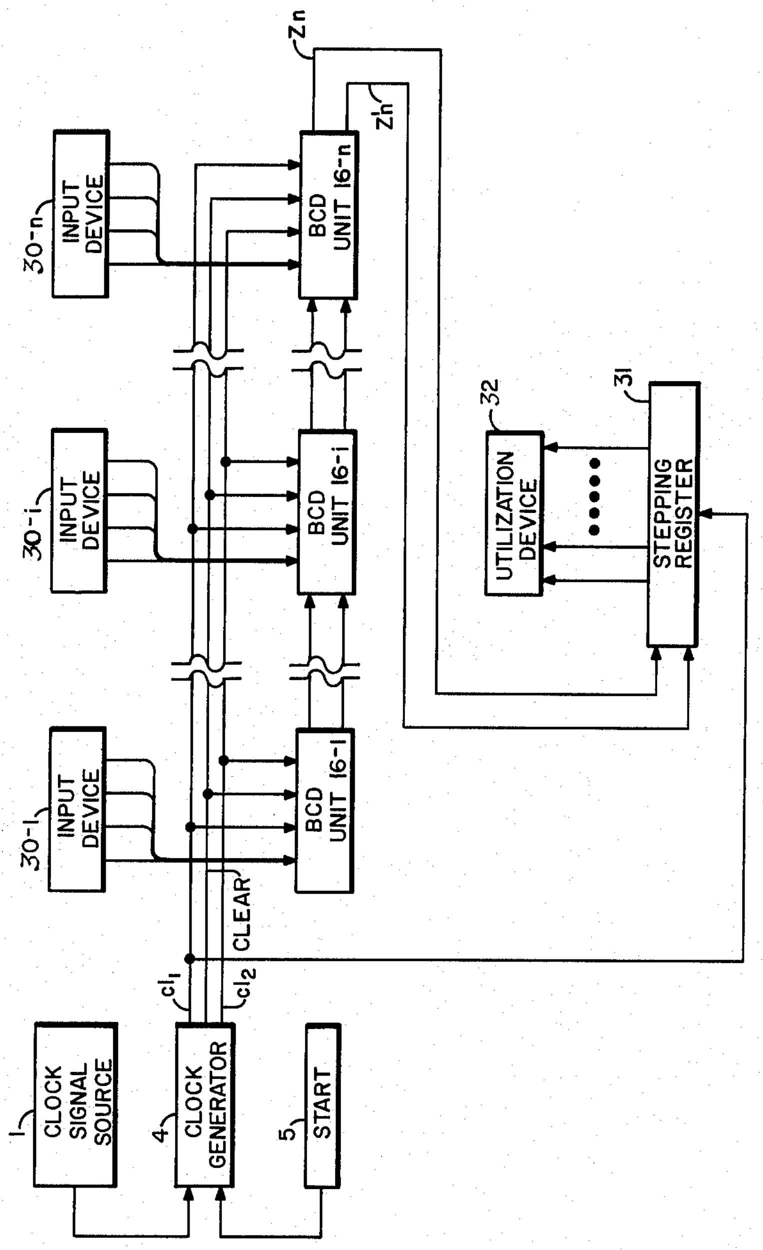
FIGURE 3 is a block diagrammatic representation of a binary coded decimal to a whole binary number converter.

The logic circuitry found in logic unit 3 and the other logic units found in the various BCD units in this FIGURE 1 and in the following FIGURE 3 are set forth in terms of a series of Boolean equations. The use of Boolean algebra to define gating networks in digital computing devices has become well known and recognized in the art as a standard method of describing the actual electronic circuitry involved. In this connection, sizeable numbers of periodicals, articles and books have been written which set forth in exhaustive detail the use of Boolean algebra as a basic design technique including its conversion from equation form to corresponding electronic digital circuits and connections.

In the following equations, it is assumed that either clock signal causes a triggering action, assuming one to be specified by the logical condition of the associated circuitry, as it goes from a relatively low to a relatively high voltage level. Signal A will be of a square wave configuration since flip-flop A merely counts the periodically appearing $c1$ input cycles. Hence, by employing it as the $c1_1$ clock, and its complementary signal A′ as the $c1_2$ clock, alternate triggering actions as is required for the operation of the included circuitry by the two will occur owing to their complementary waveforms. The Boolean equations found mechanized within logic unit 3 forming the clock signals and the flip-flop A triggerings are as follows:

$$c1_1=AB' \quad (1)$$
$$c1_2=A'B' \quad (2)$$
$$S_a=A'c1 \quad (3)$$
$$Z_a=Ac1 \quad (4)$$

The conversion program 20 is ended when counter 8, shown diagrammatically in clock generator 4, reaches an overflow condition where all of its included flip-flops $C_1$ through $C_m$, not specifically shown in the figure, are in their "1" state. Upon this occurrence, idle program 21, or B′, is entered and the $c1_1$ and $c1_2$ signals inhibited, as will be seen from Equations 1 and 2.

The idle program 21 is maintained until push-button 6 in the start unit 5 is again depressed with an output signal D being produced. The appearaance of signal D orders flip-flop B zeroed to hence shift the idle program 21 back to the conversion program 20. Simultaneous with this program switch, a clear signal is produced on the clear output conductor from logic unit 3 which acts to zero or clear all of the flip-flops in the various BCD logical units. In addition, a counter reset signal is produced and applied to counter 8 to order all of its included flip-flops triggered to a predetermined initial condition number based on the length, in terms of digits, of the conversion process required. The series of Boolean equations found mechanized in logic unit 3 associated with above triggering operations are as follows:

$$S_b=(C_1\ C_2\ \ldots\ C_m)B'c1_2 \quad (5)$$
$$Z_b=DBc1_2 \quad (6)$$
$$\text{Counter Reset}=\text{Clear}=DBc1_2 \quad (7)$$

The first clock signal produced following the entry into conversion program 20, is the $c1_1$ one, which, in turn, orders a general stepping operation in which the digits in register 10 are shifted one place to the right. In particular, the complementary signals representing the conduction state of least significant digit flip-flop in the register are designated by $Z_0$ and $Z_0'$. This conduction state is ordered stepped by way of logic unit 14–1 in BCD unit 16–1 into its associated $W_1$ flip-flop. In the same way, the $W_1$ flip-flop value is transferred into flip-flop $X_1$, the $X_1$ value into $Y_1$, and $Y_1$ into $Z_1$, all by this same clock signal. Additionally, the $Z_1$ value in BCD unit 16–1 is transferred into the $W_2$ flip-flop of the second BCD unit 16–2 and while the $W_2$ value is transferred to $X_2$, etc. Hence, a general one bit to the right, viewed from the figure, stepping operation takes place, from register 10 serially through all of the flip-flops in the various BCD units.

During the fix-up operations, ordered by each $c1_2$ clock pulse, one of two possible responses occur in each BCD unit as based upon the particular condition existing at the clock pulse. In particular, the two conditions which may exist in each BCD unit with corresponding actions are:

(1) The W flip-flop contains a "0" value. For this condition, no fix-up operation is performed.

(2) If the W flip-flop contains a "1" value, then a fix-up operation is performed in which the binary number 0011, corresponding to the decimal digit 3, is subtracted from the value represented by the W, X, Y, and Z flip-flops and the results of the subtraction placed in the same W, X, Y and Z flip-flops.

The circuitry included in all of the BCD logic units is identical and may be readily expressed in a single set of Boolean equations, given for BCD unit **16–*i***, where *i* is an integer and represents a generalized BCD unit.

$$S_{W_i}=Z_{i-1}c1_1$$
$$Z_{W_i}=Z_{i}'_{-1}c1_1+\text{clear}+(X_i'Y_i'+X_i'Z_i')c1_2W_i$$
$$S_{X_i}=X_i'W_ic1_1+(X_i'Y_i'+X_i'Z_i')c1_2W_i$$
$$Z_{X_i}=X_iW_i'c1_1+\text{clear}+(X_iY_i'+X_iZ_i')c1_2W_i$$
$$S_{Y_i}=Y_i'X_ic1_1+(Y_i'Z_i)c1_2W_i$$
$$Z_{Y_i}=Y_iX_i'c1_1+\text{clear}+(Y_iZ_i)c1_2W_i$$
$$S_{Z_i}=Z_i'Y_ic1_1+Z_i'c1_2W_i$$
$$Z_{Z_i}=Z_iY_i'c1_1+\text{clear}+Z_ic1_2W_i$$

From the equations, it will be noted that the general stepping operation occurs during the $c1_1$ interval while the fix-up operation is ordered by the second clock $c1_2$ but only if $W_i$ is equal to "1." The details of the fix-up operation as employed in the above set of equations may be readily derived, recalling that the constant 0011, corresponding to a decimal three, is subtracted from the particular value represented by the W, X, Y, and Z flip-flops.

In order to explain this technique in more detail, reference is made below to Table I in which an example is given in detail for the conversion of 1/16 or .0001 to its corresponding binary coded decimal equivalent of .0625.

TABLE I

| | Register 10 | | BCD–1 | BCD–2 | BCD–3 | BCD–4 |
|---|---|---|---|---|---|---|
| | Initial | 0001 | 0000 | 0000 | 0000 | 0000 |
| 1 | $c1_1$ | 000 | 1000 | 0000 | 0000 | 0000 |
| | $c1_2$ | -------- | 0101 | 0000 | 0000 | 0000 |
| 2 | $c1_1$ | 00 | 0010 | 1000 | 0000 | 0000 |
| | $c1_2$ | -------- | 0010 | 0101 | 0000 | 0000 |
| 3 | $c1_1$ | 0 | 0001 | 0010 | 1000 | 0000 |
| | $c1_2$ | -------- | 0001 | 0010 | 0101 | 0000 |
| 4 | $c1_1$ | -------- | 0000 | 1001 | 0010 | 1000 |
| | $c1_2$ | -------- | 0000 | 0110 | 0010 | 1001 |
| | Decimal results | -------- | 0 | 6 | 2 | 5 |

The first $c1_1$ interval shifts the least significant "1" value in register 10 into $W_1$ the most significant digit flip-flop of the first BCD–1 unit. The resulting BCD number has a value of 8 which is reduced to 0101 or 5 by the $c1_2$ ordered subtraction of 3 from it. At this point in the conversion, the series of BCD units hold a value of .5000. It may be noted at this point, that if the initial binary number to be converted were simply .1, corresponding to ½ or .5, then the single shift operation just described would produce the correct answer.

At the next $c1_1$ interval, the least significant "1" digit in BCD–1 is shifted to the most significant digit stage in the second BCD unit and the subsequent fix-up operation leaves it with a resulting value of 5. The shift operation of the first BCD unit simply changed its initial value of 5 to a final value of 2 which came from the digit in the 4's place moving one place right to end up in the 2's place digit. Hence, at this point in the conversion cycle, the number in the series of binary coded decimal units is .25 which corresponds to an input binary number of .01.

However, the operation continues until all of the register 10 values have been shifted out with, as will be seen, a final decimal equivalent value of .0625 remaining. This value corresponds to the value of the initial binary number of .0001.

It will, of course, be appreciated that the binary coded decimal number produced by the various BCD units may be scaled in powers of ten as required for the particular problem. Hence, the .0625 resulting as an answer in the particular examples cited above, may be considered as 625, 62.5 or any other scale in powers of ten as required by the particular application.

As will also be appreciated, a more involved input number could have been employed for the purpose of the preceding example. However, the particularly simple number employed is somewhat better suited for presenting the underlying principles involved in the conversion process. For example, since an essentially serial type of operation is involved, it will be understood that if the example included additional 1's each "1" would operate as it is shifted out of register 10 and down the series of BCD units, to cause the series of conversions representing its own particular value to be merely added to the residue values produced by the conversions of preceding "1's."

It will be observed from the example just given and from the mode of operation of the FIGURE 1 circuitry, each single conversion cycle shifts one bit out of register 10 and adds one additional BCD digit of conversion to the answer found in the various BCD units. Hence, if four binary bits were to be converted, then four conversion cycles would yield a BCD number found within four decimal units. These four units, although producing a perfect conversion numerically, contain considerable more potential accuracy than the single, initial four bit binary number.

Referring now to FIGURE 3, there is illustrated a conversion device according to the techniques of the present invention in which an initial binary coded decimal number is converted into whole number binary form. Again illustrated is clock signal source 1, clock generator 4 and start unit 5, all similar to the correspondingly numbered units of FIGURE 1. Also again illustrated, are the series of binary coded or BCD units beginning at 16–1, including an intermediate unit **16–*i* and ending with a final unit BCD unit 16–*n*. A series of input devices, one for each of the BCD units, are illustrated, with 30–1, 30–*i* and 30–*n*** being specifically indicated with their associated BCD units.

A pair of complementary signals $Z_n$ and $Z_n'$, coming from a flip-flop Z, not specifically shown, within final BCD unit **16–*n* are applied to the data input terminals of a stepping register 31, which additionally receives a $cl_1$ stepping signal from the $cl_1$ clock output signal line from generator 4. Shown associated with stepping register 31 is a utilization device 32** which may be, for example, an output display for indicating the value of binary numbers, or, may comprise a format converter which takes the binary number resulting from each conversion operation and places it into a format suitable for entry into a magnetic tape unit, a punch paper tape unit, a buffer storage unit, or directly into a digital computer.

The various input devices associated with the BCD units are shown in a generalized form and may individually take, as will be appreciated by those skilled in the art, any one of a large number of possible forms. For example, each device may include ten manually operable push-buttons, corresponding to the ten decimal digits, 0 to 9, each of which operates when depressed, to set a conduction state combination into the flip-flops within the BCD unit which corresponds to its decimal designation. On the other hand, the input devices may comprise the output of a general purpose computer which computes internally in binary-coded decimal form and whose output is desired in straight binary form for format conversion, recording, etc. Or, such input devices may take any one of a wide variety of other forms as are known and employed in the digital computer art.

The operation of the individual units of the FIGURE 3 circuitry is identical to the description of the operation of the same units given earlier in conjunction with FIGURE 1. In other words, again two basic programs, a conversion program and then an idle program, as previously shown in FIGURE 2, are associated with the operation of the FIGURE 3 circuitry. In addition, the same clock signals $cl_1$ and $cl_2$, and the clear and counter reset signals are again produced in the manner described earlier. In fact, the only difference between the circuitry of FIGURES 1 and 3 is in the location of the stepping register and the fact that in FIGURE 1 it held the input binary fractional coded number to be converted and here, receives the whole binary number after conversion by the BCD units. Hence, the circuits of FIGURE 1 and FIGURE 3 perform complementary or reverse functions from each other.

Inasmuch as the electronic and logical operations of the units will be understood from the earlier description of the FIGURE 1 circuitry operation, reference is made to an example included below to illustrate its particular operation. In this example a BCD number 625 represented initially by 0110, 0010 and 0101 in three BCD units, is converted into a corresponding binary number whose binal point is assumed to lie just to the right of the right-hand flip-flop, not specifically shown, in the stepping register.

TABLE II

| | Conversion cycle | BCD–1 | BCD–2 | BCD–3 | Output Binary Digit (into Register 21) |
|---|---|---|---|---|---|
| | Initial | 0110 | 0010 | 0101 | ---- |
| 1 | $cl_1$ | 011 | 0001 | 0010 | 1 |
| | $cl_2$ | ---- | ---- | ---- | ---- |
| 2 | $cl_1$ | 01 | 1000 | 1001 | 0 |
| | $cl_2$ | ---- | 0101 | 0110 | ---- |
| 3 | $cl_1$ | 0 | 1010 | 1011 | 0 |
| | $cl_2$ | ---- | 0111 | 1000 | ---- |
| 4 | $cl_1$ | ---- | 0011 | 1100 | 0 |
| | $cl_2$ | ---- | 0011 | 1001 | ---- |
| 5 | $cl_1$ | ---- | 0001 | 1100 | 1 |
| | $cl_2$ | ---- | 0001 | 1001 | ---- |
| 6 | $cl_1$ | ---- | 0000 | 1100 | 1 |
| | $cl_2$ | ---- | ---- | 1001 | ---- |
| 7 | $cl_1$ | ---- | ---- | 0100 | 1 |
| | $cl_2$ | ---- | ---- | ---- | ---- |
| 8 | $cl_1$ | ---- | ---- | 0010 | 0 |
| | $cl_2$ | ---- | ---- | ---- | ---- |
| 9 | $cl_1$ | ---- | ---- | 0001 | 0 |
| | $cl_2$ | ---- | ---- | ---- | ---- |
| 10 | $cl_1$ | ---- | ---- | 0000 | 1 |
| | $cl_2$ | ---- | ---- | ---- | ---- |

Final Number 1001110001.

It will be seen from the example that the $cl_1$ ordered shift operation performed each conversion program time takes off the binary digit represented by the Z flip-flop conduction state in the right hand BCD unit and steps it into stepping register 21. Also, the least significant binary digit is formed first followed by consecutively higher significant digits until the most significant digit is formed, during cycle 10 in the example above.

The number of stages required for stepping register 21 for any particular conversion operation is determined by the number of binary coded digits to be converted. For example, if three stages of BCD units are employed, in accordance with the above example, then obviously the highest binary coded decimal number capable of being held is 999, which, in turn, can be handled by a ten stage register. This is true since a ten stage register can hold a maximum value of 1, or 1,023, which, in turn, is larger than 999. In the same way, if four BCD units were to be converted, then the highest possible binary coded decimal number would be 9,999, which, in turn, could be handled by a stepping register of 14 bits in length since $2^{14}-1$ yields a value of 16,383 which is larger than the specified maximum BCD value. In the same way, binary register length requirements for lengths of binary coded decimal number other than those given in the two examples just cited will be readily apparent to those skilled in the art.

Figure 4:
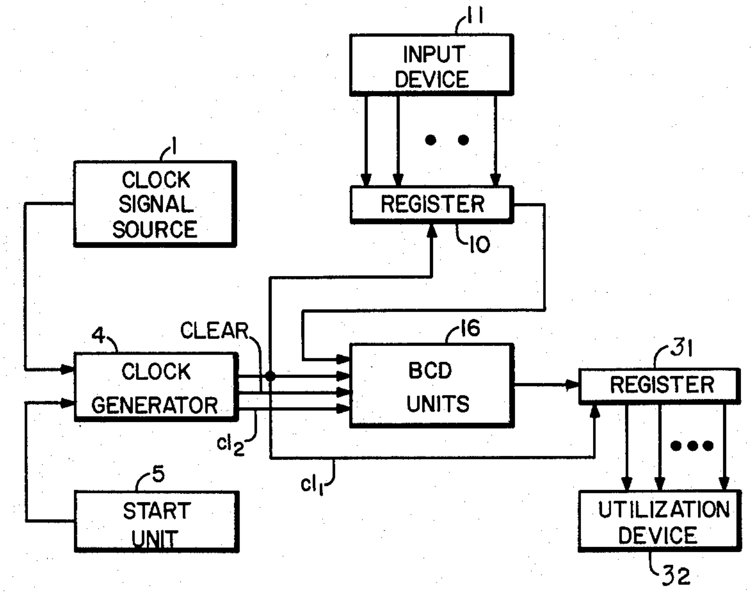
FIGURE 4 is a block diagrammatic representation of a fractional binary number to a whole binary number converter.

FIGURE 4 represents a combination of the FIGURE 1 and FIGURE 3 conversion techniques in which an initial fractional binary number is first converted into an equivalent binary coded decimal form and the resulting binary-coded decimal number then converted into a whole number binary form.

The various units of FIGURE 4 will be immediately recognized from the preceding FIGURES 1 and 2, as will be observed, the contents of register 10, from FIGURE 1, initially holding a fractional binary number, is serially fed through the series of BCD units indicated generally at 16 and there converted in the manner previously shown into equivalent binary coded decimal digits. The contents held in BCD unit 16 are stepped into register 21, from FIGURE 3, with the result that a second conversion process is effected between the binary-coded decimal number into a whole binary number. Hence, the entire operation begins with a fractional binary number and ends up with a binary number in whole number form.

In essence, this operation is equivalent to multiplying a fractional binary number by a predetermined power of 10, the multiplication moving its initial binary point found on the extreme left hand end of the number to the extreme right hand side of the number, the digits within the number, of course, being modified by the multiplication process involved.

The number of BCD units in this converter normally will correspond to the number of bits in the initial register 10, while the number of bits found in the final register 21 will be determined in the manner explained previously in connection with FIGURE 3 for the conversion of a binary coded decimal number into straight binary number form. Hence, if an exact conversion were desired for a four place fractional binary number into its equivalent whole number form, then register 10 would hold four bits, the BCD converter portion would have four BCD units while final register 21 would be, from the previous example, fourteen bits in length. In such an example, the initial fractional binary number would have been multiplied by 10,000 (decimal number system) to get it into the final resulting whole number binary form. Similarly, it will be realized that the number of BCD units corresponds to the predetermined power of 10.

It will be appreciated, that since register 10 and the BCD unit 16 have the same number of bits and units, respectively, the conversion from BCD to whole number binary involving register 31 will not be initiated until the BCD unit has been filled with the binary conversion. This, of course, occurs only after all bits in register 10 have been shifted out and converted by the BCD unit. Hence, the over-all conversion process might be thought of as including a first portion during which the fractional binary is converted into BCD and following this, a second portion, without interruption of the shifting operation, during which the BCD number converted into whole number binary in register 31.

It will be appreciated by those skilled in the art that the particular embodiments herein shown may take many different detailed embodiments, particularly with respect to the flip-flop circuits, the mechanization of the various logical gating networks, the length of the particular registers employed and a wide variety of input and output devices as indicated. In addition, the particular unit has been described in connection with the specific programming diagram of FIGURE 2 although it will be appreciated that the specific clock signals and indicated programming relationships are by way of example only, and are not intended as limitations of the underlying principles involved. It will be also understood that the underlying principle of the present invention is not dependent on any specific detailed types of circuits and may well be mechanized within a wide variety of logical frameworks and for a wide variety of purposes.

What is claimed is:

1. In combination: first register means holding a first series of binary digits forming a binary number and responsive to a series of applied first signals for stepping out said first series of digits; a plurality of serially arranged conversion means, each of said conversion means including a binary shift register means and responsive to an applied first signal for shifting the contents of said binary shift register means one binary place and producing an output digit, and responsive to an applied second signal and one predetermined bit value in said binary shift register means for modifying the value of the number stored in said binary shift register means; second register means connected to said conversion means and responsive to an applied first signal for serially storing the output digits produced in the last of said plurality of serially arranged conversion means; means for generating a series of first signals and applying each of said series of first signals to said first and second register means and to each of said plurality of conversion means; means for applying the series of binary digits stepped out of said first register means into the binary shift register means of the first of said plurality of serially arranged conversion units; means for generating a series of second signals intermediate to the generation of said series of first signals; and means for applying said series of second signals to each of said plurality of conversion means whereby a fractional binary number in said first register means is first converted to a binary coded decimal number in said plurality of conversion means and the converted binary coded decimal number being converted into a whole binary number as it is stored in said second register means.

2. A digital conversion device for converting a plurality of serially arranged binary digits representing a fractional binary number into a respective plurality of serially arranged binary coded decimal digits, said device comprising: a plurality of conversion means corresponding to said plurality of binary digits, respectively, each of said conversion means including a series of serially connected binary digit storage means, first means responsive to an applied first signal for shifting the contents of said series of binary storage means down one digit, the binary digit shifted out of the last storage means of said series of binary digit storage means representing the output binary digit of said conversion means, and second means responsive to an applied second signal and a predetermined binary digit value in the first of said series of binary digit storage means for subtracting a binary number corresponding to the decimal digit three from the contents of said series of binary digit storage means; means for generating a series of alternate first and second signals; means for applying said alternate first and second signals to each of said plurality of conversion means; means for passing the output digit from each except the last conversion means of said plurality of conversion means produced by each of said first signals to the first binary digit storage means of the next following conversion means; and means responsive to said series of first signals for serially passing the plurality of digits representing said fractional binary number to the first binary digit storage means in the first conversion means of said plurality of conversion means whereby the original binary number is converted into a plurality of binary coded decimal digits in said plurality of conversion means, respectively.

3. The digital conversion device according to claim 2 in which the plurality of binary digit storage means in each of said conversion means includes first, second, third and fourth binary digit storage means, each appearance of said first signal ordering the contents of said first, second and third binary digit storage means stepped into said second, third and fourth binary digit storage means, respectively, the output digit value of said conversion means, being stepped out of said fourth storage means.

4. The digital conversion device according to claim 3 in which each of said conversion units is responsive to the applied second signal and a binary digit value of "1" in said first binary digit storage means for subtracting said binary number corresponding to the decimal digit of three.

5. The digital conversion device according to claim 4 including, in addition, means responsive to the completion of stepping of the plurality of serially arranged binary digits representing said fractional binary number into said first conversion means for halting the generation of said alternate first and second signals.

6. The digital conversion device according to claim 4 including, in addition, register means responsive to a plurality of serially applied binary digits for storing said plurality of digits, means for applying the output digits from the fourth binary digit storage means of said last conversion means to said register means, the binary number resulting in said register means representing the whole binary number equivalent of the binary coded number formed in said plurality of conversion means.

7. The digital conversion device according to claim 6 including, in addition, means responsive to the completion of stepping the output digits from said last conversion means into said register means for halting the generation of said alternate first and second signals.

References Cited by the Examiner

UNITED STATES PATENTS

| | | | |
|---|---|---|---|
| 3,026,034 | 3/1962 | Couleur | 235—155 |
| 3,026,035 | 3/1962 | Couleur | 235—155 |
| 3,032,266 | 5/1962 | Couleur | 235—155 |

MALCOLM A. MORRISON, *Primary Examiner.*

W. M. BECKER, W. J. KOPACZ, *Assistant Examiners.*